United States Patent [19]

Olson

[11] Patent Number: 4,915,258

[45] Date of Patent: Apr. 10, 1990

[54] SEED METER SEED TUBE

[75] Inventor: Jay H. Olson, Rock Island, Ill.

[73] Assignee: Deere & Company, Moline, Ill.

[21] Appl. No.: 707,043

[22] Filed: Feb. 28, 1985

[51] Int. Cl.⁴ .............................................. B65H 3/08
[52] U.S. Cl. ................................ 221/211; 221/312 R; 193/2 R; 239/597; 239/593
[58] Field of Search ................. 221/211, 312; 222/566, 222/567, 575; 193/2 R, 4, 5; 239/592, 593, 597, 601

[56] References Cited

U.S. PATENT DOCUMENTS

| | | | |
|---|---|---|---|
| 722,799 | 3/1903 | Bevis | 222/566 X |
| 1,159,584 | 11/1915 | Heckart | 222/575 X |
| 1,581,266 | 4/1926 | Hunt | 222/566 X |
| 3,100,462 | 8/1963 | Steele et al. | 221/211 X |
| 3,680,737 | 8/1972 | Zagotta et al. | 221/211 |
| 3,788,518 | 1/1974 | Beebe | 221/211 |
| 3,999,690 | 12/1976 | Deckler | 222/194 |
| 4,162,744 | 7/1979 | Barker | 221/251 |
| 4,399,757 | 8/1983 | Maury | 221/211 |

OTHER PUBLICATIONS

Operator's Manual on "White 5100 Seed Boss Planter", dated Feb. 1980.

*Primary Examiner*—Joseph J. Rolla

[57] ABSTRACT

A seed meter for metering individual seeds at a controlled rate into a furrow in the ground over which the seed meter is traveling releases the individual seeds into a hollow, elongated seed tube. The seed tube is curved along the length thereof in a direction opposite the direction of travel of the seed meter over the ground to release the seeds with a horizontal velocity generally equal and compensate for the motion of the seed opposite that of the seed meter. This enables each seed to reach the ground with little or no velocity component in the horizontal direction, thereby minimizing lateral seed bounce on the ground. Seed bounce within the seed tube is controlled and minimized by the tube curvature which gradually increases in a downward direction along the length of the seed tube. The inner front wall of the tube has logarithmic curvature from a generally vertical upper end thereof along an upper portion of the tube and exponential curvature along a lower portion of the tube. The increasing curvature progressively reduces the angles of incidence of seed impact along the inner front wall until the seed eventually slides along the front wall at the lower end of the seed tube and exits the tube at a uniform, predictable angle. The controlled minimum seed bounce within the tube provides a generally uniform seed residence time within the tube.

6 Claims, 5 Drawing Sheets

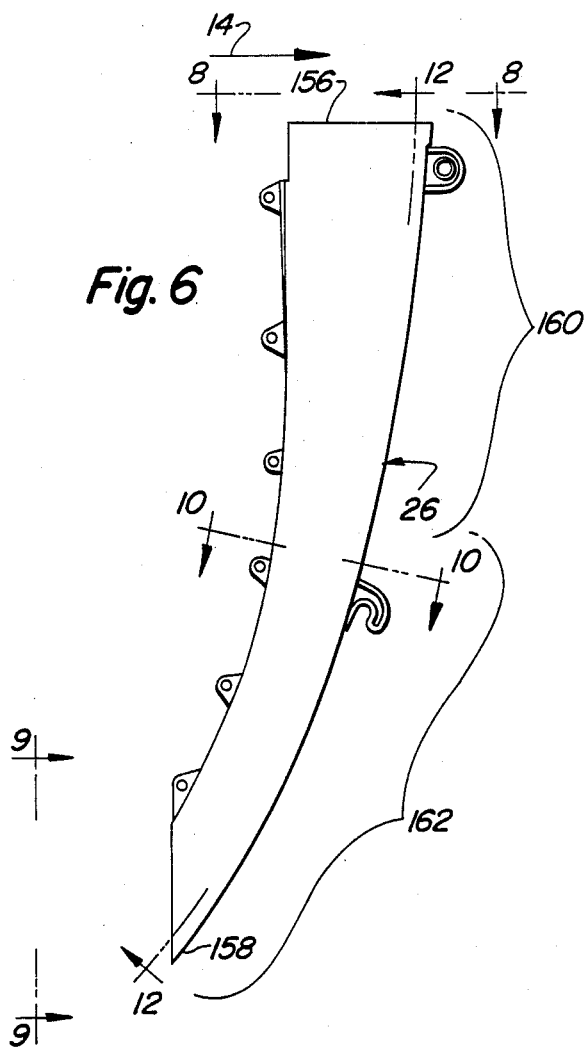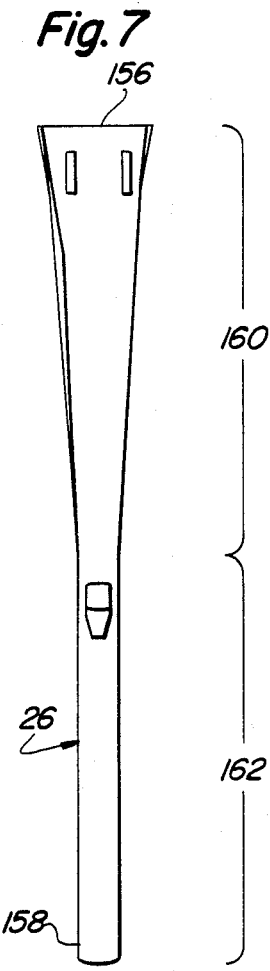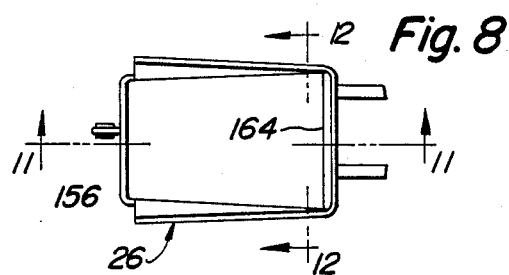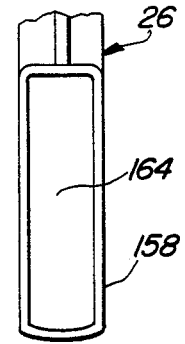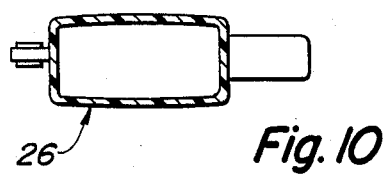
Fig. 6
Fig. 7
Fig. 8
Fig. 9
Fig. 10

SEED METER SEED TUBE

BACKGROUND OF THE INVENTION

1. Field of the Invention

The present invention relates to seed meters for metering seeds at a controlled rate into a furrow in the ground over which the seed meter is traveling, and more particularly to a hollow, elongated seed tube for directing seeds released by the seed meter into the furrow in the ground below.

2. History of the Prior Art

It is known in the field of agricultural equipment and machinery to provide seed meters which meter or dispense individual seeds into a furrow in the ground at a controlled rate in conjunction with associated apparatus for creating the furrow and then moving loose soil back into the furrow after the seeds have been deposited therein. There are various types of seed meters including the mechanical type in which individual seeds are plucked from a seed mass and discharged from the meter for deposit within the furrow by mechanical devices. Still other types of seed meters are of the air type in which a pressure differential is employed, particularly in conjunction with a rotating seed disk or similar device, to pick up seeds from the seed mass and then discharge them from the meter into the furrow. Air seed meters can be of the positive airflow type in which the seeds are picked up by the seed disk and held thereon by blowing air. Air seed meters can also be of the vacuum type in which a reduced pressure is communicated to the seed disk in a manner enabling the disk to pick up and carry individual seeds thereon with the assistance of the reduced pressure.

An example of a vacuum seed meter is provided by a copending application, Ser. No. 546,834, now abandoned, Lundie et al, VACUUM SEED METER, filed Oct. 31, 1983 and commonly assigned with the present application. The Lundie et al application describes a vacuum seed meter in which a rotating seed disk is mounted within the hollow interior of a housing so as to have a seed mass disposed on one side thereof and a source of reduced pressure coupled to a vacuum chamber at the opposite side of the disk. The reduced pressure communicates with a plurality of seed cells recessed in the side of the disk facing the seed mass via apertures extending through the thickness of the disk from the bottoms of the cells. The reduced pressure assist the cells in picking up individual seeds from the mass and transporting them to a seed discharge area sealed off from the reduced pressure to provide for release of the seeds carried in the seed cells. The released seeds fall through a discharge chute into a furrow in the ground formed by an opener unit mounted in conjunction with the seed meter.

With seed meters of any type it is desirable that the seeds be metered in such a way that they are generally equidistantly spaced along the length of the furrow. This requires not only that the seeds be metered from the seed meter in accurate fashion but that they be directed into the furrow in a manner which minimizes bouncing of the seeds along the ground.

In the case of an air seed meter employing a rotating seed disk, the individual seeds carried by the seed disk are typically released from the disk at a desired location within the circular path of the disk by isolating the pressure differential from the seed disk in that region. In the case of the vacuum seed meter described in the previously referred to Lundie et al application a seal surrounding and forming a part of a vacuum chamber at one side of the seed disk is configured so as to isolate a portion of the seed disk opposite a seed discharge area from the reduced pressure in the vacuum chamber. The seed discharge area lies at a portion of the side of the seed disk within the hollow interior of the housing surrounding the seed disk. The interruption of communication of the reduced pressure to a portion of the seed disk allows seeds carried within recessed seed cells in the disk with the aid of the reduced pressure to be released from the cells. The individual seeds as so released fall under the effects of gravity through a seed discharge chute at the bottom of the seed meter to the furrow in the ground below.

Seed meters travel over the ground at some nominal velocity during the metering process. Typically, a plurality of the meters are mounted in parallel on the elongated frame of a wheeled agricultural implement which is towed over the field to be planted. If the individual seeds are released from each seed meter for essentially vertical, straight down movement into the furrow below under the effects a gravity, the seeds as they strike the ground have a velocity which has a horizontal component due to the motion of the seed meter over the ground. This horizontal velocity component frequently causes the seeds to bounce laterally in a direction away from the intended landing areas, resulting in inaccurate and nonuniform distribution of the seeds within the furrow.

It is therefore desired that the horizontal velocity component upon seed impact with the ground be minimized or eliminated so that any seed bounce will be essentially vertical and the seed will eventually settle in the desired landing area within the furrow. This may be accomplished by providing each seed meter with a seed tube configured so as to compensate for and cancel out the effects of the horizontal velocity component. Thus, while not shown in the previously referred to Lundie et al application, the vacuum seed meter described therein is typically equipped with a seed tube designed to minimize or eliminate the horizontal velocity component of the individual seeds as they strike the ground. Such seed tube which is coupled to the seed chute at the bottom of the seed meter so as to extend downwardly therefrom and is curved in a direction opposite the direction of movement of the seed meter over the ground. The seeds are thereby caused to exit the seed tube in a direction providing them with a horizontal velocity component generally equal to and opposite the horizontal velocity component provided by movement of the seed meter over the ground. The seed tube is relatively straight along an upper portion thereof and has a constant, fixed curvature along a lower portion. The straight upper portion of the seed tube is aligned in accordance with the direction of seed release by the meter to provide relatively smooth receipt of the seeds within the seed tube. The lower portion of the seed tube is curved by an amount sufficient to release each seed at a desired angle relative to the vertical so as to provide the seed with a horizontal velocity component capable of compensating for the horizontal velocity of the seed meter over the ground.

It has been found that while seed tubes of the type described are somewhat effective in minimizing or eliminating the horizontal velocity component from seed discharge, such seed tubes can introduce problems of their own which detract from the advantages of using them. A major problem with such seed tubes is the tendency for seed rattle or seed bounce to occur within the tube. This describes the situation in which the seeds undergo excessive bouncing within the tube with the result that they have varying residence times within the seed tube and exit from the tube at differing and unpredictable angles. These factors have a harmful affect on uniformity of the metering process. Different residence times of the individual seeds within the seed tube results in nonuniform timing of discharge of the seeds from the seed tube. Varying seed discharge angles from the seed tube which result in nonuniform seed distribution, even in situations where seed residence time within the tube is uniform.

Accordingly, it would be advantageous to provide an improved seed tube for use with seed meters.

It would furthermore be advantageous to provide an improved seed tube which in addition to compensating for horizontal seed velocity due to motion of the seed meter over the ground minimizes seed rattle or bounce within the tube so as to provide relatively uniform seed residence time within the tube and a relatively uniform angle of seed discharge from the tube.

BRIEF DESCRIPTION OF THE INVENTION

These and other objects are accomplished in accordance with the invention by the provision of a seed tube having a slope at an upper end thereof which is generally aligned with the mean direction of seed release from the seed meter so as to minimize the angle of incidence of the initial seed contact with the interior walls of the seed tube. The seed tube is provided with a curvature in a direction opposite the direction of movement of the seed meter over the ground which increases with increasing distance along the length of the seed tube from the upper end. The increasing curvature provides for decreasing angles of incidence of seed bounce within the seed tube following the initial contact so that eventually the seed simply slides along a front wall of the tube as it approaches the lower end of the tube where the seed is discharged.

Controlling of seed bounce within the tube in the manner provided by the invention results in a generally uniform seed residence time within the tube as well as a generally uniform angle of seed release from the lower end of the tube, thereby greatly enhancing the control of the metering process. At the same time the seeds are released from the tube with an appropriate horizontal velocity component so as to compensate for movement of the seed meter relative to the ground, enabling each seed to strike the ground with little or no horizontal velocity component.

In a specific example of a seed meter having a seed tube in accordance with the invention, the individual seeds are released from a rotating seed disk within the meter so as to move downwardly in generally vertical direction. The slope of a front wall within the seed tube at an upper end of the tube where the tube is joined to the seed discharge chute of the meter is also generally vertical so as to extend in the mean direction of seed release of the seed meter. The seed tube is curved along substantially its entire length such that an upper portion thereof adjacent the upper end follows a generally logarithmic curve while a lower portion thereof extending between the upper portion and a lower end of the tube follows an exponential curve. The logarithmically curved upper portion of the seed tube provides the tube with increasing curvature in the downward direction while at the same time providing the front wall within the tube with a generally straight and vertically disposed surface at the upper end of the tube. This enables the initial seed impacts which occur within the upper portion of the seed tube to be at very small angles of incidence. The exponential curvature of the lower portion of the seed tube provides increasing curvature in the downward direction along the length of the tube in a fashion which provides for increasingly smaller angles of incidence of seed bounce within the tube following the initial impact. Seed bounce is quickly controlled and the seeds eventually slide along the front wall of the tube at the lower end at a predictable angle and a minimum, generally uniform residence time.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIG. 6 is a left side view of the seed tube of FIG. 1;

FIG. 7 is a front view of the seed tube of FIG. 1;

FIG. 8 is a top view of the seed tube of FIG. 1;

FIG. 9 is a rear view of the lower portion of the seed tube of FIG. 1;

FIG. 10 is a sectional view of the seed tube of FIG. 1 taken along the line 10—10 of FIG. 6;

DETAILED DESCRIPTION

Figure 1:
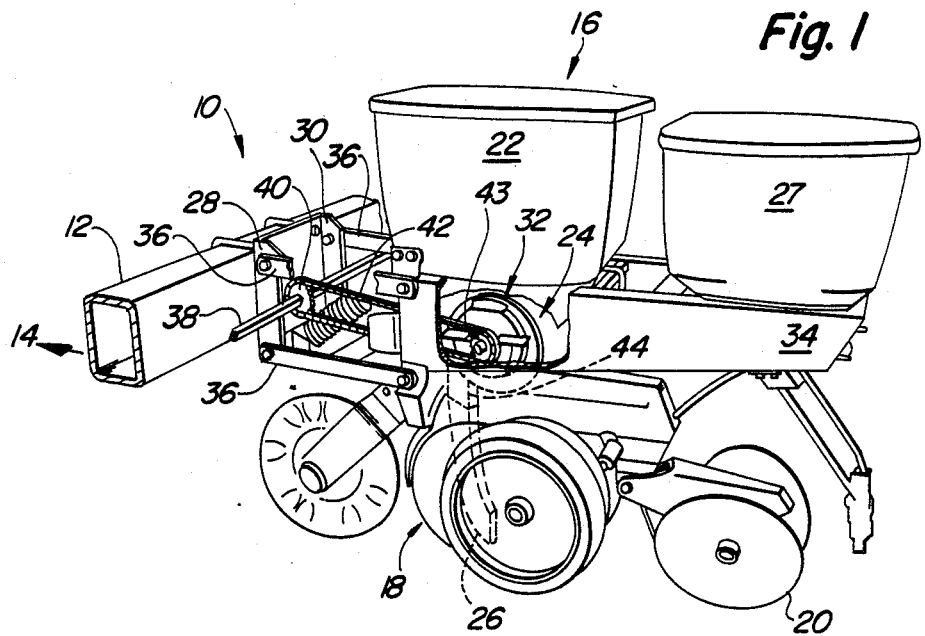
FIG. 1 is a perspective view of a planting unit which includes a seed meter having a seed tube in accordance with the invention.

FIG. 1 depicts a portion of a planting implement 10 including a main frame 12 which is supported by a plurality of wheels (not shown) and is adapted for towing in a given forward direction 14 by a tractor. Attached to the main frame 12 are a plurality of planting units 16 mounted in generally parallel, side-by-side relationship along the length thereof. Only one of the planting units 16 is shown in FIG. 1.

The planting unit 16 includes an opener 18, closing wheels 20 and a seed hopper 22. As the tractor pulls the main frame 12 over the ground in the given forward direction 14, the opener 18 opens a furrow in the ground. Seeds from the seed hopper 22 flow into a seed meter 24 which is shown in dotted outline in FIG. 1 and which forms a part of the planting unit 16. The seed meter 24 dispenses individual seeds through an attached seed tube 26 (also shown in dotted outline in FIG. 1) into the furrow at a controlled rate as the main frame 12 is advanced in the given forward direction 14. The closing wheels 20 which trail both the seed meter 24 and the opener 18 close the furrow onto and over the seeds dispensed by the seed meter 24.

Mounted at the back of the planting unit 16 is a pesticide hopper 27. The pesticide hopper 27 is capable of containing an insecticide and is provided with conventional apparatus for dispensing controlled amounts of insecticide where desired in conjunction with planting of seeds by the planting unit 16.

As shown in FIG. 1 the planting unit 16 is mounted on the back of the main frame 12 by a pair of generally vertical brackets 28 and 30. The seed hopper 22 and the attached seed meter 24 are disposed within a frame 34. The frame 34 trails behind and is capable of undergoing up and down motion relative to the main frame 12 and the attached brackets 28 and 30 by a plurality of arms 36. Two of the arms 36 are pivotably coupled to both the bracket 28 and one side of the frame 34. The other two arms 36 are pivotally coupled to the bracket 30 and to the opposite side of frame 34.

An elongated shaft 38 is rotatably mounted behind the main frame 12 and has a chain sprocket 40 mounted thereon between the brackets 28 and 30. The chain sprocket 40 is coupled by a chain 42 to a second chain sprocket 43 (shown in dotted outline) which is mounted below the seed hopper 22 at one side of the seed meter 24. The second chain sprocket 43 is coupled to rotate a seed disk within the seed meter 24 to provide the dispensing of individual seeds from a seed discharge chute 44 (shown in dotted outline in FIG. 1) at the bottom of the seed meter 24 which is coupled to the seed tube 26.

The planting unit 16 is similar to a planting unit described in detail in the previously referred to copending application of Lundie et al. As described in the Lundie application the planting implement 10 includes a wheel which is maintained in contact with the ground so as to roll over the ground as the planting implement 10 is advanced by the tractor in the given forward direction 14. The wheel is coupled to the shaft 38 so as to rotate the shaft 38 as the wheel rotates. The shaft 38 rotates at a speed in direct proportion to the rotational speed of the wheel and therefore in direct proportion to the speed at which the main frame 12 and the various planting units 16 are moving over the ground in the given forward direction 14. Accordingly, the shaft 38 rotates at a speed directly related to the speed of movement of the main frame 12 over the ground. By coupling the shaft 38 to the seed meter 24 via the chain sprocket 40, the chain 42 and second chain sprocket 43, the rate of seed discharge from the seed meter 24 is co-ordinated with the speed of the main frame 12.

As seen in FIG. 1 the opener 18 is disposed in a forward location of the planting unit 16. The opener 18 opens a furrow in the ground into which the individual seeds from the seed meter 24 are discharged at the desired spacing. The closing wheels 20 which are disposed rearwardly of the planting unit 16 collaspe dirt from the opposite sides of the furrow into the furrow wall and cover the seeds discharged by the seed meter 24.

Figure 2:
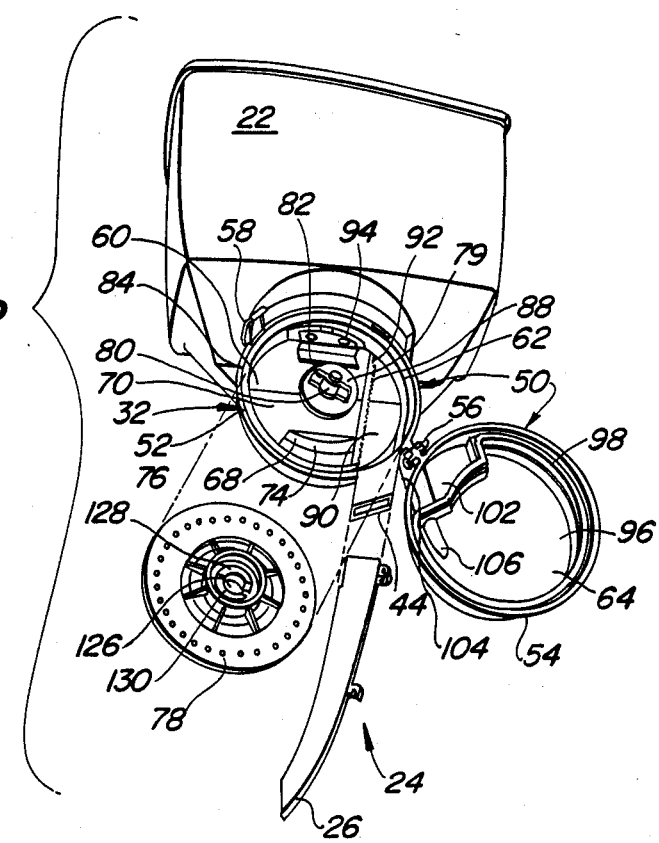
FIG. 2 is perspective view of a portion of the planting unit of FIG. 1 showing a seed hopper in conjunction with the seed meter and its seed tube, the seed meter being disposed in an open position in conjunction with a removable seed disk.

FIG. 2 shows the seed meter 24 in some detail. Except for the seed tube 26 and a slightly different configuration of the seed discharge chute 44, the seed meter 24 is virtually identical to the vacuum seed meter shown and described in the previously referred to Lundie et al application which is incorporated herein by reference. Accordingly, the seed meter 24 is described only briefly hereafter.

The vacuum seed meter 24 has a generally cylindrical housing 50 which is comprised of a first half shell 52 and a second half shell 54. The first and second half shells 52 and 54 are of somewhat similar configuration and are coupled together by a hinge assembly 56. A clasp assembly 58 which is mounted on opposite sides of the first and second half shells 52 and 54 from the hinge assembly 56 is used to hold the half shells 52 and 54 together in a closed position.

The first half shell 52 is comprised of a generally disk-shaped back wall 60 and a generally cylindrical side wall 62 joined to the back wall 60 at the outer periphery of the back wall 60. Likewise, the second half shell 54 is comprised of a generally disk-shaped back wall 64 and a generally cylindrical side wall 66 which is coupled to the outer periphery of the back wall 64. The first half shell 52 is mounted at the bottom of the seed hopper 22 so that seeds contained within the hopper 22 flow by gravity into a seed chute 68 at the back of the first half shell 52. A seed baffle insert 70 which is of generally planar configuration and which is mounted on a portion of the back wall 60 forms the seed chute 68 together with an outer wall 72 (shown in FIG. 4) of the first half shell 52. The seed baffle insert 70 also forms an opening 74 at the bottom of the first half shell 52 through which the seed chute 68 communicates with a seed reservoir 76 at the inside of the first half shell 52. The configuration of the seed baffle insert 70 and the opening 74 formed thereby control the seed level in the seed reservoir 76.

Figure 3:
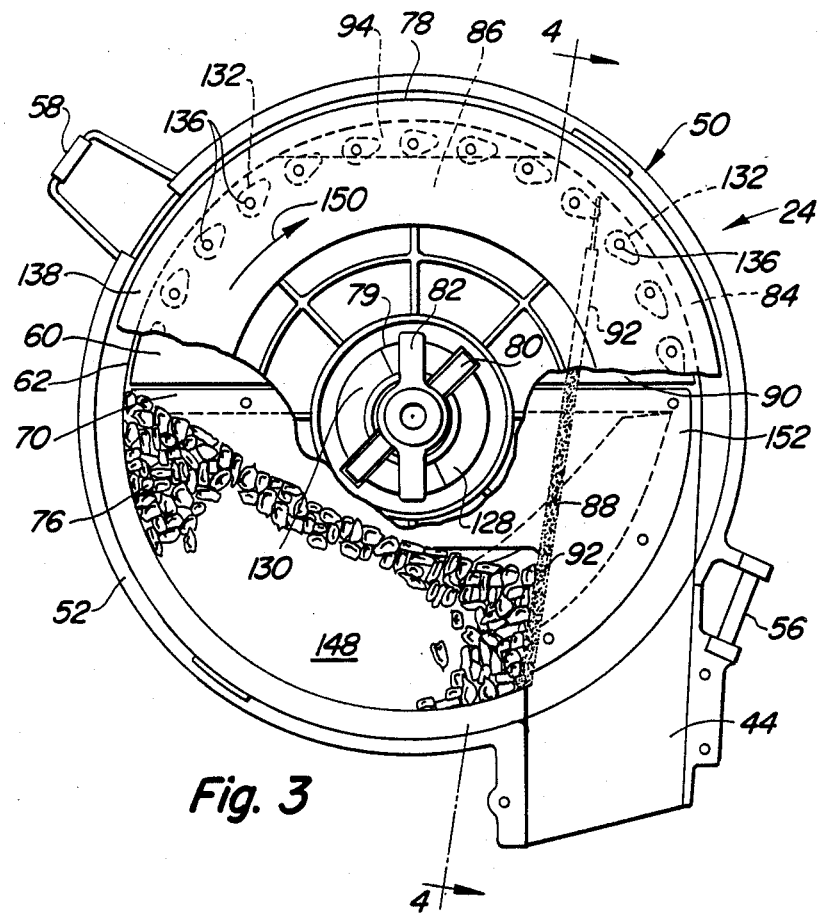
FIG. 3 is front view of a portion of the seed meter of FIGS. 1 and 2 showing a seed mass therein together with individual seeds which are picked up from the seed mass and then released from the seed disk for discharge from the meter.

The seed reservoir 76 extends between the seed baffle insert 70 and a seed disk 78 when the seed disk 78 is mounted within the housing 50 comprised of the first and second half shells 52 and 54. By action of gravity seeds within the seed hopper 22 flow downwardly from the hopper 22 into the seed chute 68 at the back of the first half shell 52. From the seed chute 68 the seeds flow through the opening 74 and into the seed reservoir 76. The resulting seed mass is shown in FIG. 3.

The seed disk 78 is releasably and rotatably mounted within the cylindrical housing 50 by being mounted on a hub assembly 79 at the center of the first half shell 52. The hub assembly 79 includes a rotatably mounted disk attaching mechanism 80 which has a handle 82. Rotation of the handle 82 locks the seed disk 78 to and unlocks the disk 78 from the hub assembly 78. When the seed disk 78 is mounted on the hub assembly 79, the outer periphery of the disk 78 is disposed in close proximity to a generally ring-shaped seed barrier 84 mounted on the generally cylindrical side wall 62 of the first half shell 52. Accordingly, the seed disk 78 essentially closes off the open interior of the first half shell 52 so as to form a first or seed chamber 86 which includes the seed reservoir 76 at the bottom thereof.

A separating wall 88 extending across the inside of the first shell 52 between opposite portions of the side wall 62 of the first half shell 52 defines a separate seed discharge area or chamber 90 within the first or seed chamber 86. As described in greater detail in the Lundie et al application, seeds from the seed reservoir 76 at the bottom of the first half shell 52 are picked up by the seed disk 78 where they are held in place by the effects of reduced pressure from a vacuum source coupled to the interior of the second half shell 54. The individual seeds remain attached to the seed disk 78 until they reach the seed discharge chamber 90 which is isolated from the reduced pressure within the second half shell 54. This releases the seeds from the seed disk 78, whereupon the individual seeds fall through the seed discharge chute 44 and the seed tube 26 to the furrow in the ground below. The seed discharge chute 44 is coupled to the first half shell 52 so as to communicate with the interior of the first half shell 52 at the bottom of the seed discharge chamber 90. An elongated seed retainer brush 92 is mounted on the top of and extends along the length of the separating wall 88 so as to be disposed adjacent the seed disk 78. The seed retainer brush 92 combines with the separating wall 88 to form a substantially complete barrier between the back wall 60 and seed disk 78 while at the same time permitting fins which may be located on the surface of the seed disk 78 to pass through such barrier.

An air inlet opening 94 formed in the back wall 60 of the first half shell 52 at the top of the first half shell 52 permits air to flow into the first or seed chamber 86 at the interior of the first half shell 52 from outside of the seed meter 24. A small amount of such air flow is needed to assure atmospheric pressure in the chamber 86 so that the reduced pressure within the second half shell 54 will hold the individual seeds in place as they are picked up by the seed disk 78.

The second half shell 54 has a second or vacuum chamber 96 at the interior thereof. The second or vacuum chamber 96 is defined by the back wall 64 in conjunction with a vacuum seal 98 mounted on and extending upwardly from the back wall 64. The vacuum seal 98 is disposed adjacent and inside of the generally cylindrical side wall 66 of the second half shell 54 around most of the perimeter of the side wall 66. However, at a portion of the second half shell 54 adjacent the hinge assembly 56, the seal 98 extends across the second half shell 54 in a manner so as to define a non-vacuum chamber 102 within the second half shell 54 and adjacent the second or vacuum chamber 96. A vacuum port 104 formed in the back wall 64 of the second half shell 54 terminates in an opening 106 which communicates with the second or vacuum chamber 96 within the second half shell 54.

The vacuum port 104 is coupled to a vacuum source which may comprise a centrifugal blower. This enables the reduced pressure of the vacuum source to be communicated through the vacuum port 104 and the opening 106 to the vacuum chamber 96. The vacuum chamber 96 applies the reduced pressure to a major portion of the seed disk 78. The portion of the seed disk 78 which is not exposed to the reduced pressure is that portion residing between the seed discharge chamber 90 within the first half shell 52 and the non-vacuum chamber 102 within the second half shell 54. The particular configuration of the vacuum seal 98 prevents the reduced pressure within the vacuum chamber 96 from communicating with the non-vacuum chamber 102. The absence of the reduced pressure of the vacuum source at the portion of the seed disk 78 adjacent the non-vacuum chamber 102 provides for release and discharge of the individual seeds on the seed disk 78 within the seed discharge chamber 90.

As seen in FIG. 2 the center of the seed disk 78 is provided with an elongated slot 126 therein disposed between an opposite pair of semicircular ramps 128 and 130 of gradually increasing height. The handle 82 is of elongated configuration and of appropriate size so as to pass through the elongated slot 126 of the seed disk 78 as the seed disk 78 is mounted on the hub assembly 78. When the seed disk 78 is so mounted, rotation of the handle 82 causes the handle to ride up on the ramps 128 and 130, thereby securing the seed disk 78 in place on the hub assembly 79.

Figure 5:
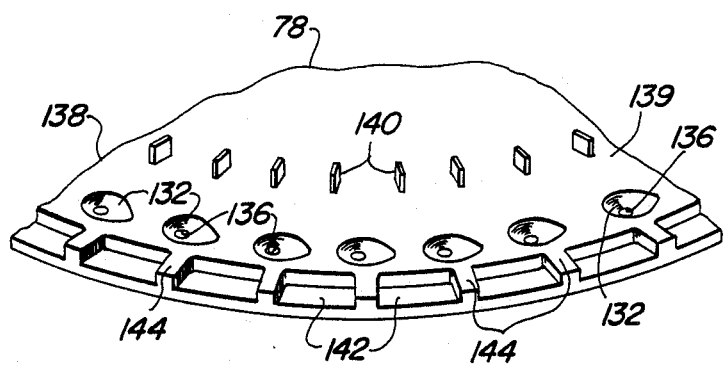
FIG. 5 is plan view of a portion of the outer periphery of the seed disk of the seed meter of FIGS. 1-4.

FIG. 5 depicts a portion of the seed disk 78 including four different seed cells 132. Each of the seed cells 132 is recessed into the seed disk 78 from a side surface 134 of the seed disk 78 and terminates at an aperture 136 at the bottom of the seed cell 132. The aperture 136 extends through the thickness of the seed disk 78 to a side surface 138 of the seed disk 78 opposite the side surface 134. The seed cells 132 and the included apertures 136 are arranged in a circumferential row along the outer periphery of the seed disk 78.

The seed disk 78 is also provided with a plurality of fins 140 extending outwardly from the side surface 134 just inside of the seed cells 132. The fins 140 assist in agitating seeds of a seed mass within the seed reservoir 76 to assist in acceleration of the seeds for pick up by the seed cells 132 as described hereafter.

The outer edge of the seed disk 48 is provided with an alternating succession of cavities 142 and intervening radial ribs 144. The cavities 142 and the radial ribs 144 are useful in agitating and dislodging debris at the interface between the first half shell 52 and the second half shell 54 to enhance expulsion of such debris from the inside of the generally cylindrical housing 50.

Figure 4:
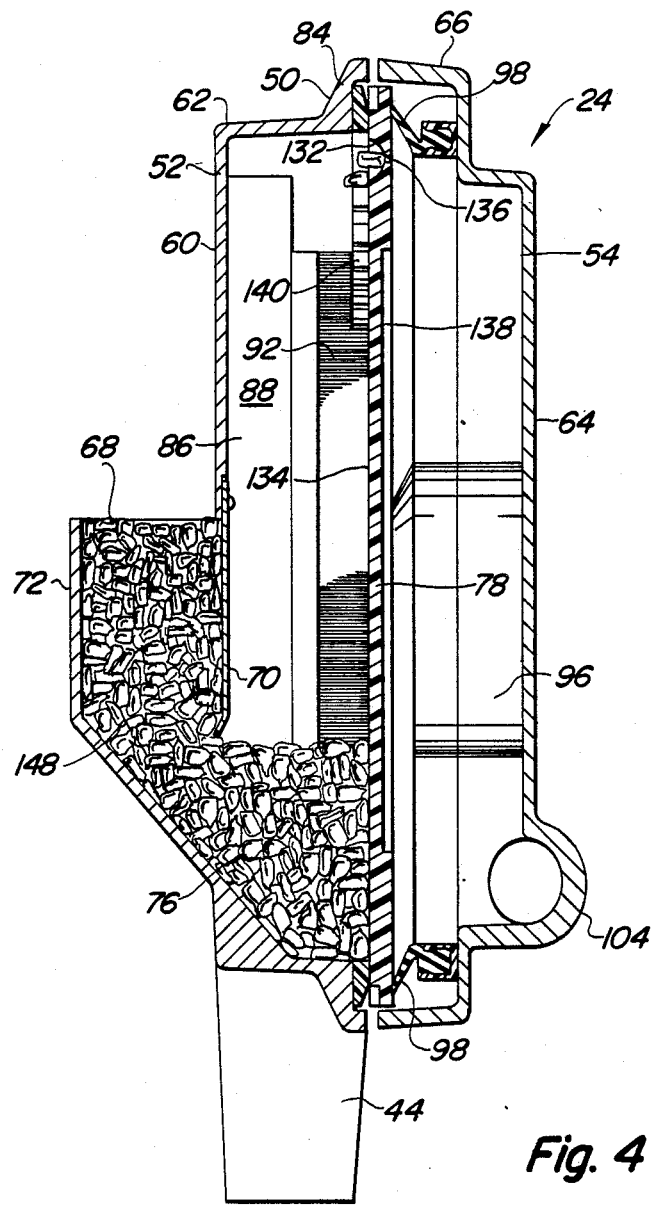
FIG. 4 is a sectional view of the seed meter of FIGS. 1-3 taken along the line 4—4 of FIG. 3.

As previously noted in connection with FIG. 1, movement of the planting implement 10 in the given forward direction 14 causes rotation of the elongated shaft 38 and thus the chain sprocket 40 mounted thereon. This rotates the chain sprocket 43 via the chain 42 which in turns causes rotation of the seed disk 78 within the housing 50 of the seed meter 24. As shown in FIGS. 3 and 4 the side surface 134 of the seed disk 78 which includes the seed cells 132 is disposed adjacent both the seed reservoir 76 and the seed discharge chamber 90 when the seed disk 78 is mounted on the hub assembly 79 within the housing 50 of the seed meter 24. At the same time the opposite side surface 138 of the seed disk 78 is exposed to the reduced pressure within the vacuum chamber 96 except for that portion of the side surface 138 within the non-vacuum chamber 102 opposite the seed discharge chamber 90. The reduced pressure of the vacuum chamber 96 communicates with the seed cells 132 in the opposite side surface 134 of the seed disk 78 via the apertures 136.

As previously described seeds from the seed hopper 22 flow through the seed chute 68 into the seed reservoir 76. This forms a seed mass 148 within the seed reservoir 76 as shown in FIGS. 3 and 4. As the planting implement 10 is towed in the given forward direction 14, seed disk 78 is rotated within the housing 50 of the seed meter 24 in a direction shown by an arrow 150 in FIG. 3. This causes the various seed cells 132 of the seed disk 78 to pass through and then rise above the seed mass 148 before passing the seed retainer brush 92 and entering the seed discharge chamber 90. From the seed discharge chamber 90 the various seed cells 132 again cross the seed retainer brush 92 and enter the seed reservoir 76 for passage through the seed mass 148.

As described in the previously referred to copending application of Lundie et al the seed cells 132 with the help of the fins 140 shown in FIG. 5 provide agitation and then acceleration of individual seeds within the seed mass 148 as they pass through the seed mass 148. This action coupled with the effects of the reduced pressure communicated through the apertures 136 from the vacuum chamber 96 causes a different seed to be captured and retained within each seed cell 132 as the seed cell 132 raises out of the seed mass 148. The seed remains within the seed cell 132 until the seed cell 132 crosses the seed retainer brush 92 and enters the seed discharge chamber 90. With the reduced pressure cut off from the seed disk 78 in the region of the seed discharge chamber 90 as provided by the shape of the vacuum seal 98 and the non-vacuum chamber 102 created thereby, the seed is released from the seed cell 132 for discharge from the seed meter 24. Because of the speed of rotation of the seed disk 78 and the residual effects of the reduced pressure within the aperture 136 at the bottom of the seed cell 132, the seed is typically released from the seed cell 132 when the seed cell 132 reaches a "3 o'clock" position represented by a dot 152 in FIG. 3. This causes the released seed to fall vertically downwardly into the seed discharge chute 44 under the urging of gravity.

A "3 o'clock" seed release position is generally preferred in seed meters of the type shown in FIGS. 1-5 because it allows the direction of seed exit from the seed meter to be aligned with the direction of gravitational pull. This provides for relatively uniform seed delivery within a wide range of possible rotational speeds of the seed disk.

The generally vertical release of the individual seeds from the seed cells 132 within the seed discharge chamber 90 would normally cause such seeds to fall straight down into the ground below from the seed meter 24. However, because the planting implement 10 is being towed in the given forward direction 14 at some nominal speed, the individual seeds will tend to arrive at the surface of the ground below at an angle other than 90° which encourages lateral bouncing of the seed. As previously noted such lateral bouncing is undesired because of the nonuniformities in seed distribution that result.

Consequently, it is desirable to compensate for the horizontal velocity component introduced into the path of the seeds due to the motion of the planting of implement 10 by discharging the seeds with a horizontal velocity component opposite and approximately equal to the horizontal velocity component introduced by movement in the given forward direction 14. This is provided by the seed tube 26 which curves rearwardly in a direction opposite the given forward direction 14. At the same time, and in accordance with the invention, the seed tube 26 is configured so as to minimize seed rattle or bounce therein so that control can be maintained over the metering of the seeds from the seed meter 24. The seed tube 26 is shown in detail in FIGS. 6-12.

Turning to FIG. 6 which is a left side view of the seed tube 26 and in which the given forward direction 14 is shown, it will be seen that the seed tube 26 curves rearwardly in a direction opposite the given forward direction 14. The seed tube 26 has an upper end 156 and an opposite lower end 158. A first portion 160 of the seed tube 26 extends downwardly along part of the length thereof from the upper end 156. A second portion 162 of the seed tube 26 extends between the first portion 160 and the lower end 158.

The seed tube 26 which is hollow and of elongated configuration and is characterized by a curvature which gradually increases in a downward direction with increasing distance from the upper end 156. The increasing curvature is true of the seed tube 26 in general and is particularly true of a front wall 164 extending along the length of the seed tube 26 at the inside of the front of the seed tube 26. The front wall 164 is where the initial seed impact and subsequent impacts of the seed within the seed tube 26 typically occur.

Primarily for reasons dealing with the spare into which the seed tube 26 most fits the seed tube 26 is tapered along the length thereof. This also has the effect of reducing any seed cross bounce therein. As seen in FIG. 6 the thickness of the seed tube 26 as viewed from the side gradually decreases from a maximum at the upper end 156 to a minimum at the lower end 158. As viewed in FIG. 7 the width of the seed tube 26 as viewed from the front decreases from a maximum at the upper end 156 to a minimum at the approximate juncture between the first and second portions 160 and 162 and remains essentially at the minimum along the second portion 162. A comparison of FIGS. 8 and 10 illustrates that the cross sectional area of the seed tube 26 is considerable greater at the upper end 156 than at a mid-point approximately at the juncture between the first and second portions 160 and 162 and where the sectional view of FIG. 10 is taken.

Figures 11, 12:
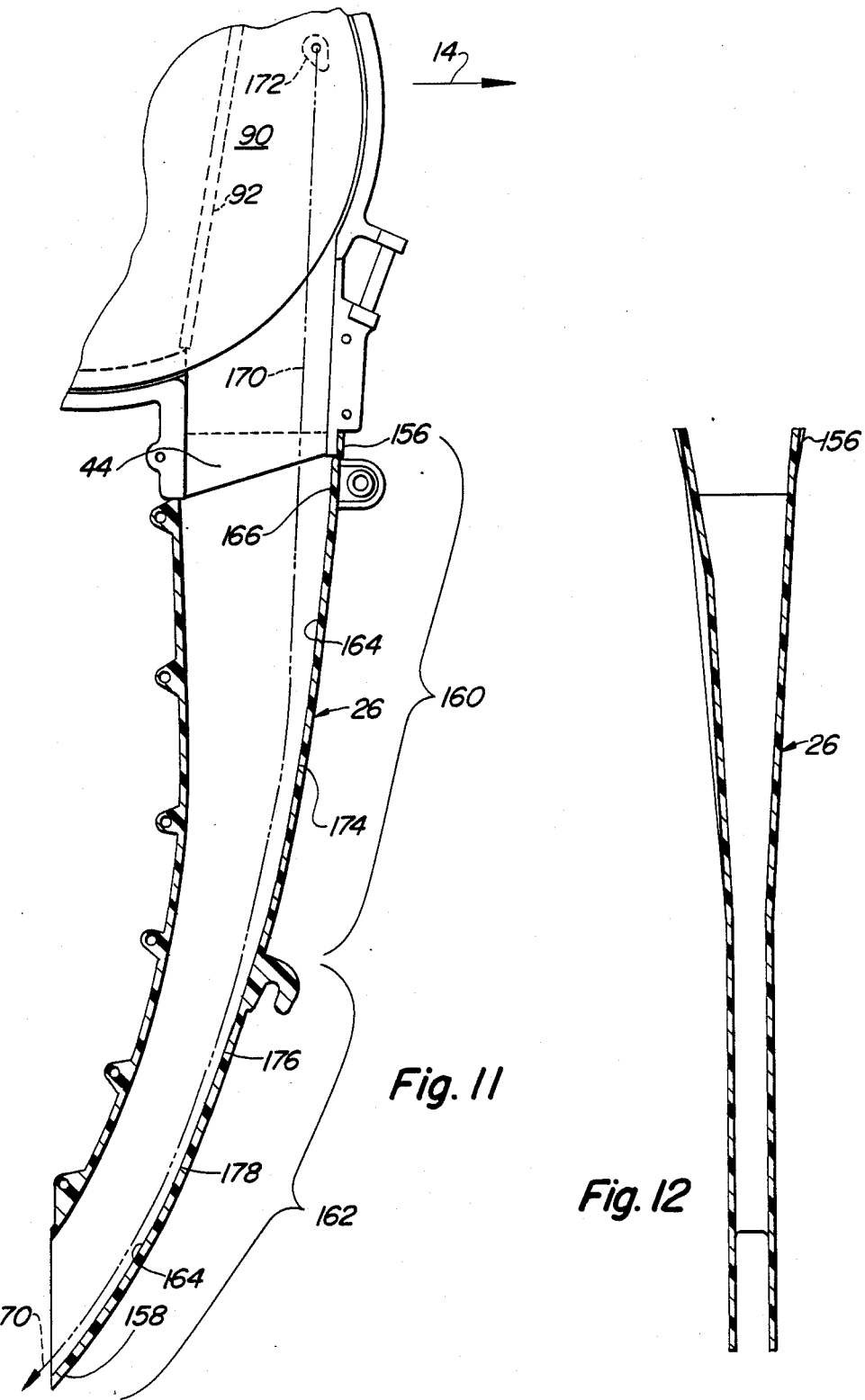
FIG. 11 is a sectional view of the seed tube and a portion of the seed meter of FIG. 1, the sectional view of the seed tube being taken along the line 11—11 of FIG. 8.
FIG. 12 is a sectional view of the seed tube of FIG. 1 taken along the line 12—12 of FIGS. 6 and 8.

As perhaps best seen in FIG. 11 the front wall 164 at the upper end 156 of the seed tube 26 is disposed so as to extend or slope essentially in the same direction as the mean direction of seed release. It was previously noted that the seeds are released from the seed cells 132 at essentially the "3 o'clock" position 152 in the rotational path of the seed disk 78 so that the mean direction of seed release in the present example is essentially vertically downward. As seen in FIG. 11 the front wall 164 has an upper portion 166 thereof adjacent the upper end 156 which is also generally vertically disposed. This provides for clearance between the upper portion 166 of the front wall 164 and the seed as the seed enters the top portion of the seed tube 26. It also provides for a small angle of incidence of initial seed contact or impact with the front wall 164 as the front wall 164 begins to curve rearwardly in the downward direction along the length of the seed tube 26 with such curvature gradually increasing.

The result is that the front wall 164 defines a logarithmic curve along the first portion 160 of the length of the seed tube 26. Logarithmic curves are well known and have a shape defined by the exponent that indicates the power to which the a number is raised to produce a given number. Because of the logarithmic shape of the front wall 164 along the first portion 160, the front wall 164 can have a gradually increasing curvature along the length of the first portion 160 while at the same time allowing the front wall 164 to straighten out into the generally vertical upper portion 166 adjacent the upper end 156 of the seed tube 26.

At the juncture between the first and second portions 160 and 162 of the seed tube 26, the curvature of the front wall 164 continues to gradually increase in the downward direction so that the portion of the front wall 164 lying within the second portion 162 defines an exponential curve. Exponential curves are also well known and the shape thereof is defined by a variable exponent in a mathematical expression.

The increasing curvature of the front wall 164 of the seed tube 26 in the downward direction has the effect of not only minimizing the angle of incidence of the first contact of the seed with the front wall 164 but also of progressively reducing the angles of incidence of subsequent contacts of the seeds with the front wall 164 until ultimately the seed tends to slide along the front wall 164 as it exits the lower end 158 of the seed tube 26. This is illustrated in FIG. 11 where a dashed line 170 represents the path of a seed released from a particular one 172 of the seed cells 132 which is essential in the "3 o'clock" position. As shown by the dashed line 170 the seed proceeds to fall essentially vertically downwardly to a point 174 of initial contact with the front wall 164. Because of the curvature of the front wall 164, the angle of incidence formed between the dashed line 170 and the slope of the front wall 164 at the point 174 is relatively small. This is highly desirable as the angles of incidence of the initial and subsequent contacts of the seed must be kept small if seed rattle or bounce within seed tube 26 is to be minimized or eliminated. It has been found that the angle of incidence of initial contact of the seed with the front wall 164 in seed tube 26 according to the invention is typically less than 6°. This contrasts sharply with angles of incidence of initial seed contact which are typically on the order of 12° or greater in the prior art seed tube typically used with seed meters of this type.

Following initial contact at the point 174, the seed has a second contact with the front wall 164 at a point 176 as illustrated in FIG. 11. This is followed by a third contact at a point 178 along the front wall 164. Because of the increasing curvature of the front wall 164 in the downward direction along the length of the seed tube 26 in accordance with the invention, each contacting of the seed with the front wall 164 is characterized by an angle of incidence tending to be less than the angle of incidence of the immediately preceding contact. Thus, the angle of incidence at the contact point 176 is less than the angle of incidence at the point 174. Similarly, the angle of incidence at the point 178 is less than the angle of incidence at the point of 176. At the point 178 the angle of incidence is almost 0° so that a short distance below that the seed tends to slide along the front wall 164 and continues to do so as it exits the lower end 158 of the seed tube 26.

Because most or all seeds follow the path represented by the dashed line 170 or approximations thereof, control over the seed metering process is maintained. At the same time a horizontal velocity component is added which compensates for the forward speed of the planting implement 10 over the ground. Seeds travel through the seed tube 26 with a minimum of bouncing so that the time of travel therethrough is relatively uniform. Accordingly, seeds released at a relatively constant rate from the seed disk 78 are discharged from the lower end 158 of the seed tube 26 at the same relatively constant rate.

Because the seeds tend to exit the lower end 158 of the seed tube 26 while sliding along the front wall 164, the angle of seed discharge tends to remain constant, again providing for predictable and uniform dispensing of the seeds into the furrow in the ground below.

While the invention has been particularly shown and described with reference to a preferred embodiment thereof, it will be understood by those skilled in the art that various changes in form and details may be made therein without departing from the spirit and scope of the invention.

What is claimed is:

1. In a seed meter in which seeds are periodically released for deposit on the ground below, a seed tube for receiving the released seeds and directing the seeds toward the ground in controlled fashion comprising a hollow, elongated member extending generally downwardly from an upper end thereof at the seed meter toward the ground and terminating at a lower end opposite the upper end, the seed tube having a curvature which increases with increasing distance from the upper end thereof along at least a portion of the length thereof and following a logarithmic curve along a first portion of the length thereof extending downwardly from the upper end thereof and an exponential curve along a second portion of the length thereof downwardly from the first portion to the lower end.

2. The invention set forth in claim 1, wherein the seed meter is mounted to be moved over the ground in a given general direction and the curvature of the seed tube is in a direction generally opposite the given general direction in which the seed meter is mounted to be moved.

3. The invention set forth in claim 2, wherein a portion of the seed tube at the upper end is generally vertically disposed relative to the ground.

4. A seed meter comprising the combination of a housing having a hollow interior and mounted to be moved over the ground in a given general direction, a seed disk rotatably mounted within the hollow interior of the housing, means defining a seed discharge area within the hollow interior of the housing adjacent the seed disk, means defining a seed chamber within the hollow interior of the housing adjacent the seed disk and opposite the seed discharge area, means for providing a pressure differential at the seed disk in the region of the seed chamber to aid in the pickup of seeds from the seed chamber by the seed disk, the pressure differential being blocked from the seed disk in the region of the seed discharge area whereby seeds picked up by the seed disk within the seed chamber are released from the seed disk within the seed discharge area in a general direction of seed release, a hollow seed discharge chute extending to the bottom of the housing from the seed discharge area, and a hollow seed tube having an upper end coupled to the seed discharge chute and extending downwardly from the seed meter, the seed tube having a slope at the upper end in the general direction of seed release and curving along at least a portion of the length thereof in a direction opposite the given general direction, the seed tube curving exponentially along a lower portion of the seed tube which terminates at a lower end opposite the upper end and having an upper portion extending between the lower portion and the upper end, the seed tube curving logarithmically along the upper portion.

5. The invention set forth in claim 4, wherein the general direction of seed release and the slope of the seed tube at the upper end are generally vertical.

6. A seed tube comprising a hollow, elongated member having a first end, an opposite second end and an internal surface extending between the opposite first and second ends and forming a front wall, the front wall having a curvature which increases gradually in a direction from the first end to the opposite second end along at least a portion of the member and following a logarithmic curve along a first portion of the member extending from the first end and an exponential curve along a second portion of the member extending between the first portion and the second end.

* * * * *